UNITED STATES PATENT OFFICE.

JOHN B. C. BARBANSON, OF SAN FRANCISCO, CALIFORNIA.

LUBRICANT.

SPECIFICATION forming part of Letters Patent No. 359,418, dated March 15, 1887.

Application filed July 8, 1886. Serial No. 207,511. (No specimens.)

*To all whom it may concern:*

Be it known that I, JOHN B. C. BARBANSON, a citizen of the United States, residing at the city and county of San Francisco, State of California, have invented a new and useful Composition of Matter to be Used as a Lubricant, of which the following is a specification.

My composition of matter consists of the following ingredients, combined substantially in the proportions stated, viz: crude petroleum, forty-five pounds; vegetable or animal oil, ten pounds; plumbago, two and a half pounds; carbonate of magnesia, seven and a half pounds; bicarbonate of soda, seven and a half pounds.

The manner of preparing the lubricant is as follows: The plumbago, carbonate of magnesia, and bicarbonate of soda are mixed in with the oils, and the mass is then passed three times through a mill such as is used in mixing paint, and which is for the purpose of thoroughly mixing the ingredients together by grinding. The compound is then allowed to stand three or four days, during which time the chemical reaction takes place, and is completed.

The soda mixes with the oil, making a saponaceous compound, with which unites the magnesia, which, being light in weight, has considerable bulk, and produces, with the petroleum, a body of sufficiently thick consistence to hold the plumbago perfectly in suspension.

This lubricant is a liquid thin enough to be used in ordinary squirt cans, and yet it holds the plumbago in suspension and makes no deposit whatever. In its use it does not run from the bearings, and it has a tendency to cool them. It is economical in its preparation and remains liquid under all temperatures.

I am aware that lubricants have been made in which plumbago has been used in connection with an oil and an alkali; but many of these lubricants are grease, and where they are not so they are very thick—a result which has been necessary in order to provide for the suspension of the plumbago; but in my lubricant the plumbago is held perfectly in suspension, and at the same time the lubricant is in a comparatively thin liquid state.

Having thus described my invention, what I claim as new, and desire to secure by Letters Patent, is—

The herein-described composition of matter to be used as a lubricant, consisting of crude petroleum, vegetable or animal oil, plumbago, carbonate of magnesia, and bicarbonate of soda, in the proportions substantially as specified.

In witness whereof I have hereunto set my hand.

JOHN B. C. BARBANSON.

Witnesses:
C. D. COLE,
J. H. BLOOD.